3,473,882
PROCESS FOR DYEING AND PRINTING POLY-
ALKYLENE TEREPHTHALATE FIBERS WITH
DISPERSED ANTHRAQUINONE DYESTUFF
Kurt Weber and Hansruedi Rickenbacher, Basel, and Ulrich Meister, Aesch, Basel-Land, Switzerland, assignors to Ciba Limited, Basel, Switzerland, a Swiss company
No Drawing. Continuation-in-part of application Ser. No. 232,606, Oct. 23, 1962. This application May 3, 1965, Ser. No. 452,864
Claims priority, application Switzerland, Oct. 24, 1961, 12,274/61
Int. Cl. D06p 1/20
U.S. Cl. 8—39       5 Claims

ABSTRACT OF THE DISCLOSURE

Process for dyeing and printing synthetic fiber materials, e.g. polyalkylene terephthalate fibers and union fabrics made from said polyesters and cotton, from an aqueous dispersion containing as the dispersed dye an anthraquinone of the formula:

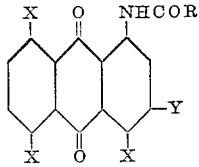

in which formula R represents a benzene radical, and at least one X represents a member selected from the group consisting of hydrogen atoms, amino groups, lower alkanoyl amino groups, a lower alkoxy group and a halogen atom, and the other symbols X represent hydrogen atoms, and Y is a member selected from the group consisting of hydrogen, halogen, lower alkyl, lower alkoxy, phenoxy, lower alkyl-mercapto, nitro, cyano, acetyl and lower carbalkyl groups, and fixing the dye impregnated materials with heat, e.g. at temperatures of about 100° to 220° C.

---

This is a continuation-in-part of our copending application Ser. No. 232,606 filed Oct. 23, 1962 (now abandoned).

The present invention is based on the observation that valuable dyeings and prints can be obtained on synthetic fiber material, especially on aromatic polyesters, when the material to be dyed is heated with an aqueous dispersion of a dyestuff of the formula

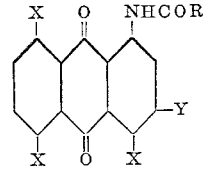

in which R represents a benzene residue, at least one X represents a hydrogen or halogen atom, an amino group, a lower alkanoylamino, a lower alkoxy or a nitro group, and the other symbols X represent hydrogen atoms and Y is a member selected from the group consisting of hydrogen, halogen, lower alkyl, lower alkoxy, phenoxy, lower alkylmercapto, nitro, cyano, acetyl and lower carbalkoxy groups. The benzene residue R may contain as possible substituents, halogen atoms for example chlorine, bromine or fluorine or alkyl or alkoxy groups. As lower alkanoylamine groups there may be mentioned, for example, those which are derived from formic acid, acetic acid, propionic acid, butyric acid, or capronic acid.

As examples of dyestuffs to be used in the process of the invention there may be mentioned the following:

1-benzoylamino-anthraquinone,
1-(α-naphthoylamino-anthraquinone),
1-benzoylamino-4-chloranthraquinone,
1-benzoylamino-5-chloranthraquinone,
1-benzoylamino-2:4-dichloranthraquinone,
1-amino-4-benzoylamino-anthraquinone,
1-amino-4-ortho-fluoro-benzoylamino-anthraquinone,
1-amino-4-para-chlorobenzoylamino-anthraquinone,
1-amino-4-paramethoxybenzoylamino-anthraquinone,
1-amino-5-benzoylamino-anthraquinone,
1:8-diamino-4-benzoylamino-anthraquinone,
1-amino-4-benzoylamino-5- or -8-nitro-anthraquinone,
1-amino-2-bromo-4-benzoylamino-anthraquinone,
1-amino-2-cyano-4-benzoylamino-anthraquinone,
1-amino-2-nitro-4-benzoylamino-anthraquinone,
1-amino-2-methoxy-4-benzoylamino-anthraquinone,
1-benzoylamino-2-methoxy-anthraquinone,
1-benzoylamino-2-methyl-anthraquinone,
1-benzoylamino-4-methylmercapto-anthraquinone,
1-benzoylamino-2-isobutylmercapto-anthraquinone,
1-benzoylamino-5-ethylmercapto-anthraquinone,
1-amino-6:7-dichloro-4-benzoylamino-anthraquinone,
1-methylamino-4-benzoylamino-anthraquinone,
1-phenylamino-4-benzoylamino-anthraquinone,
1-acetylamino-2-benzoylamino-3-chloranthraquinone,
1-acetylamino-4-benzoylamino-3-chloranthraquinone,
1-acetylamino-4- or -5-benzoylamino-anthraquinone,
1-formylamino-4-benzoylamino-anthraquinone,
1-butyrylamino-4- or -5-benzoylamino-anthraquinone,
1-acetylamino-4-(para-chlorobenzoylamino)-anthraquinone.

Most of the above-mentioned dyestuffs are known compounds that can be obtained by a known method, for example, by the monobenzoylation of the appropriate amino compound.

Instead of the pure dyestuffs, there can also be used dyestuff mixtures for example, mixtures that differ from one another in the substituents they have in the benzoyl residue or mixtures that differ by the aliphatic acylamino groups being present in addition to the benzoylamino group. In many cases such mixtures show better affinity than the single dyestuff.

For dyeing, the aforesaid dyestuffs are advantageously used in a finely divided form, and dyeing is carried out in the presence of dispersing agents, for example, soap, sulphite cellulose waste liquor or synthetic detergents, or a combination of different wetting and dispersing agents. Before dyeing, it is advantageous to convert the dyestuff to be used into a dyeing preparation that contains a dispersing agent and a finely divided dyestuff in such a form that a fine dispersion is formed when the said dyestuff preparation is diluted with water. Such dyestuff preparations can be made in known manner, for example, by re-precipitating the dyestuff from sulfuric acid and grinding the suspension so obtained with sulfite waste liquor, if necessary also by grinding the dyestuff in a highly effective grinding device in the dry state, or in the wet state, with or without the addition of dispersing agent.

In order to obtain stronger dyeings on polyethyleneterephthalate fibers, it has proved to be advantageous to add a swelling agent to the dyebath, or more especially to carry out the dyeing process at super-atmospheric pressure at a temperature above 100° C., for example, at 120° C. As swelling agents there may be used aromatic carboxylic acids, for example, benzoic acid or salicylic acid, phenols, for example ortho- or para-hydroxy-diphenyl, aromatic halogen compounds, for example chlorobenzene, ortho-dichlorobenzene or trichlorobenzene, phenylmethylcarbinol or diphenyl. When dyeing under super-atmospheric pressure it has proved to be advantageous to make the dyebath slightly acidic, for example, by adding a weak acid, for example, acetic acid.

By virtue of their fastness to alkali, the dyestuffs to be used in the process of the invention are also suitable for application by the so-called thermofixation process, in which process the fabric to be dyed is impregnated, advantageously at a temperature not exceeding 60° C., with an aqueous dispersion of the dyestuff advantageously containing 1 to 50 % of urea and a thickening agent, especially sodium alginate, and is then squeezed in the usual manner. Squeezing is advantageously carried out in such a manner that the impregnated goods retain 50 to 100% of their dry weight of dye liquor.

Fixation of the dyestuff is carried out by heating the impregnated fabric, advantageously after drying, to a temperature above 100° C., for example, to a temperature between 180 to 220° C., for example, in a current of hot air.

The above-mentioned thermofixation process is of special interest for the dyeing of union fabrics made of polyester fibers and cellulosic fibers, especially cotton. In this case the padding liquor contains, in addition to the dyestuffs to be used in the process of the invention, dyestuffs that are suitable for dyeing cotton, especially vat dyestuffs, or reactive dyestuffs that is to say, dyestuffs that are fixed to the cellulosic fiber by the formation of a chemical bond, that is to say, dyestuffs that contain a chlorotriazine residue or a chlorodiazine residue. In the latter case it is advantageous to add an agent capable of binding acid to the padding liquor, for example, an alkali carbonate or an alkali phosphate, an alkali borate or an alkali perborate, or mixtures of these substances. When dyeing with vat dyestuffs, it is necessary to treat the padded fabric, after the heat treatment, with an aqueous alkaline solution of one of the reducing agents normally used in vat dyeing.

The dyeings obtained by the process of the invention are advantageously subjected to an after-treatment, for example, heating with an aqueous solution of a non-ionic detergent.

Instead of by impregnation, the dyestuffs to be used in the process of the invention can also be applied to the fabric by printing. For this purpose there is used, for example, a print paste which, in addition to the usual assistants used in printing, for example wetting and thickening agents, contains the finely dispersed dyestuff, if necessary, in admixture with one of the above-mentioned cotton dyestuffs, if necessary, together with urea and/or an agent capable of binding acid.

In view of the fact that they give good reservation of wool, the dyestuffs to be used in the process of the invention are also suitable for dyeing union fabrics made of polyester fibers and wool, either at 100° C. in the presence of a swelling agent or by the thermofixation process.

The process of the invention yields strong, full dyeings and prints possessing excellent properties of wet fastness and an excellent fastness to light and an excellent fastness to sublimation.

Compared with the closest related prior art dyestuff which has been used for dyeing polyester fibers, viz the 1,4-dihydroxy-5-benzoylaminoanthraquinone disclosed in Patent No. 3,005,822 to Jenny, applicants dyes have the unobvious beneficial property of yielding strong and fast dyeings also according to the important thermofixation process.

In U.S. Patent No. 2,876,061, granted Mar. 3, 1959 to General Aniline & Film Corporation there is described a process in which water-insoluble anthraquinone dyestuffs, for example, 1-amino-4-benzoylamino-anthraquinone or 1-amino-5-benzoylamino-anthraquinone are converted into water-soluble products by a treatment with an alkali hydroxide in diethyleneglycol, and are used in this form for dyeing polyester fibers. However, during the alkali-treatment the benzoyl group is split off and hence the diaminoanthraquinones and not the aminobenzoylaminoanthraquinones are applied to the polyester fibers according to the process of Mautner.

The following examples illustrate the invention, and unless otherwise stated, the parts and percentages are by weight.

EXAMPLE 1

1 part of an aqueous paste of the dyestuff of the formula

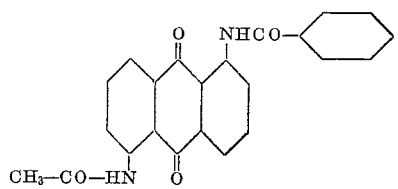

and approximately 1 part of dried sulphite cellulose waste liquor are ground to a fine paste in a roller mill, the paste so obtained having a dyestuff content of 10%.

100 parts of a fibrous material made of polyethyleneterephthalate are washed for half an hour in a bath containing, per 1000 parts of water, 1 to 2 parts of the sodium salt of N-benzyl-μ-heptadecyl-benzimidazole disulfonic acid and 1 part of a concentrated aqueous ammonia solution.

The material is then entered into a dyebath containing, per 3000 parts of water, 1 part of acetic acid of 40% strength, and in which 10 parts of the dyestuff paste obtained in the manner described in the first paragraph and 4 parts of the sodium salt of N-benzyl-μ-heptadecylbenzimidazole disulfonic acid have been dispersed. The whole is then heated to 130° C. in a pressure vessel, and kept at that temperature for half an hour to 1 hour. The material is then well rinsed and, if necessary, washed for half an hour at 60 to 80° C. with a solution containing, per 1000 parts of water, 1 part of the sodium salt of N-benzyl-μ-heptadecylbenzimidazole disulfonic acid. There is obtained a yellow dyeing possessing an excellent fastness to sublimation and an excellent fastness to light.

A similar dyeing is obtained when a concentrated dyestuff dispersion is padded or printed on to a polyester fabric in the presence of a thickening agent, for example, an alginate and, after an intermediate drying, the dyestuff is fixed on the fiber by heating for a short period of about 220° C. (Thermosol process).

In the following table, there are listed a number of other dyestuffs which, when applied by the processes described above, dye polyethyleneterephthalate fibers the tints listed in column II.

| No. | I | II |
|---|---|---|
| 1 | 1-acetylamino-4-benzoylamino-anthraquinone | Orange. |
| 2 | 1-benzoylamino-anthraquinone | Yellow. |
| 3 | 1-benzoylamino-4-chloranthraquinone | Do. |
| 4 | 1-amino-4-benzoylamino-anthraquinone | Violet. |
| 5 | 1-amino-4-(meta-methoxybenzoylamino)-anthraquinone | Do. |
| 6 | 1-amino-4-(para-chlorobenzoylamino)-anthraquinone | Do. |
| 7 | 1-amino-4-(meta-methylbenzoylamino)-anthraquinone | Do. |
| 8 | 1-acetylamino-5-benzoylamino-antraquinone | Yellow. |
| 9 | 1-butyrylamino-5-benzoylamino-anthraquinone | Do. |
| 10 | 1-hexahydrobenzoylamino-5-benzoylamino-anthraquinone | Do. |
| 11 | 1-chloroacetylamino-4-benzoylamino- anthraquinone | Orange. |
| 12 | 1-chloroacetylamino-5-benzoylamino-anthraquinone | Yellow. |
| 13 | 1-acetylamino-4-(para-chlorobenzoylamino)-anthraquinone | Orange. |
| 14 | 1-α-naphthoylamino-anthraquinone | Yellow. |
| 15 | 1-formylamino-4-benzoylamino-anthraquinone | Orange. |
| 16 | 1-methoxy-4-benzoylamino-anthraquinone | Yellow-orange. |
| 17 | 1-methylamino-4-benzoylamino-anthraquinone | Violet. |
| 18 | 1-carbethoxyamino-5-benzoylamino-anthraquinone | Yellow. |
| 19 | 1-carbomethoxyamino-5-benzoylamino-anthraquinone | Do. |
| 20 | 1-amino-2-methyl-4-benzoylamino-anthraquinone | Bluish red. |
| 21 | 1-amino-2-methoxy-4-benzoylamino-anthraquinone | Red. |
| 22 | 1-amino-2-bromo-4-benzoylamino-aathraquinone | Violet. |
| 23 | 1-amino-2-chloro-4-benzoylamino-anthraquinone | Do. |
| 24 | 1-amino-2-phenoxy-4-benzoylamino-anthraquinone | Pink. |
| 25 | 1-amino-2-methylmercapto-4-benzoylamino-anthraquinone | Bluish red. |
| 26 | 1-amino-2-nitro-4-benzoylamino-anthraquinone | Blue. |
| 27 | 1-amino-2-cyan-4-benzoylamino-anthraquinone | Do. |
| 28 | 1-amino-2-acetyl-4-benzoylamino-anthraquinone | Do. |
| 29 | 1-amino-2-carbomethoxy-4-benzoylamino-anthraquinone | Do. |
| 30 | 1-amino-2-carbo-isobutyroxy-4-benzoylamino-anthraquinone | Do. |

EXAMPLE 2

A mixture consisting of 2 parts of 1-amino-4-benzoylamino-anthraquinone and 1 part of 1-amino-4-(para-chlorobenzoylamino)-anthraquinone is used and the procedure described in the first and second paragraphs of Example 1 is adopted. A strong, violet dyeing is obtained, that is stronger than the dyeing obtained with 1-amino-4-benzoylaminoanthraquinone alone.

If a mixture consisting of 1 part of 1-acetylamino-5-benzoylaminoanthraquinone and 1 part of 1 - butyrylamino - 5 - benzoylaminoanthraquinone is used, a strong yellow dyeing is obtained, which is stronger than the dyeing which the 1-acetylamino-5-benzoylaminoanthraquinone alone.

EXAMPLE 3

100 parts of a fibrous material made of polyethyleneterephthalate are washed for half an hour in a bath containing, per 1000 parts of water, 1 to 2 parts of the sodium salt of N-benzyl-μ-heptadecylbenzimidazole disulfonic acid and 1 part of a concentrated aqueous ammonia solution. The material is then entered into a dyebath containing, per 300 parts of water, 15 parts of a mixture consisting of approximately equal parts of ortho-hydroxydiphenyl, pine oil and sulfonated castor oil, and 15 parts of acetic acid, and allowed to swell therein for half an hour at 80° C. The bath is then allowed to cool to 50° C., whereupon the dyestuff paste obtained as described in Example 2 is added. The dyebath is brought to the boil in the course of half an hour to ¾ hour, and dyeing is continued for 1 to 1½ hours as close to the boil as possible. The material is then well rinsed and, if necessary, washed for half an hour at 60 to 80° C. with a solution containing, per 1000 parts of water, 1 part of the sodium salt of N-benzyl-μ-heptadecylbenzimidazole disulfonic acid. There is obtained a violet dyeing possessing an excellent fastness to sublimation and an excellent fastness to light.

EXAMPLE 4

The following ingredients are mixed together:

300 parts of gum arabic (1:1)
300 parts of crystal gum (1:2)
250 parts of water
40 parts of cyclohexanone
40 parts of thiodiglycol
50 parts of a 10% solution of the sodium salt of metanitrobenzene sulfonic acid
20 parts of a mixture of potassium oleate and pine oil 1000 parts Into 800 parts of the stock thickening so prepared there are stirred, with the aid of a high-speed stirrer, 200 parts of the dyestuff paste obtained as described in the first paragraph of Example 1, stirring being continued until the paste is completely dispersed. A polyethyleneterephthalate fabric is then printed with the paste so obtained. After printing, the fabric is dried, steamed for 45 minutes at ¾ atmosphere (gauge), rinsed for 10 minutes in cold water, centrifuged, and dried. There is obtained a fast yellow dyeing.

EXAMPLE 5

200 parts of urea and 20 parts of the dyestuff of the formula

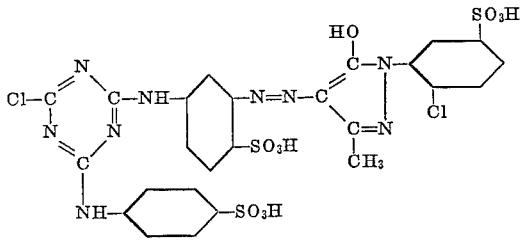

are dissolved by boiling in 400 parts of water. To the solution so obtained are added 100 parts of an aqueous dispersion containing 30 parts of 1-acetylamino-5-benzoylamino-anthraquinone and 2 parts of the sodium salt of di-isobutylnaphthalene sulfonic acid. The whole is then well mixed for a few minutes with the aid of a high-speed stirrer, in which process 100 parts of a sodium carbonate solution of 20% strength and 400 parts of a sodium alginate solution of 50% strength are added simultaneously.

A union fabric consisting of 35 parts of cotton and 65 parts of polyethyleneterephthalate fiber is padded, at 60° C., with the padding solution so prepared, in such a manner that the impregnated cloth retains 65 to 70% of its dry weight of dyestuff solution. It is then dried and then subjected to a heat treatment for 1 minute at 200 to 220° C.

The material is then washed at the boil for 20 minutes in a solution containing 2 g./l. of a non-ionic detergent and 2 g./l. of calcinated sodium carbonate, whereupon it is rinsed and dried. There is obtained a yellow dyeing possessing very good properties of fastness.

EXAMPLE 6

14 parts of 1-acetylamino-5-benzoylamino-anthraquinone and 14 parts of the dyestuff of the formula

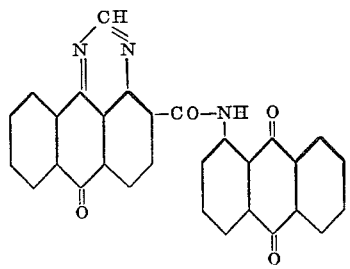

are finely ground in a ball mill along with 28 parts of dinaphthylmethane disulfonic acid and 84 parts of water. A padding liquor of the following composition is then prepared:

200 parts of the dyestuff paste described above
300 parts of sodium alginate 1:100
500 parts of water 1000 parts A polyester-cotton union fabric is padded with the above padding liquor (2 runs) to a 50 to 60% weight increase and is then dried at 60° C. The fabric is then subjected to a heat treatment for 15 to 120 seconds at 200 to 220° C., and subsequently treated in a bath containing 4 g./l. of sodium hydrosulfite, 6 g./l. of sodium hydroxide solution of 36° Bé. and 30 g./l. of sodium chloride, first for 10 minutes at 60° C. and then for 20 minutes at 50° C. The material is then oxidized, rinsed, and further treated in the manner described in Example 1. There is obtained a yellow dyeing possessing excellent properties of fastness.

EXAMPLE 7

20 parts of 1-amino-4-benzoylamino-anthraquinone are ground to fine paste in a ball mill along with 20 parts of dinaphthylmethane disulfonic acid and 70 parts of water. A padding liquor is prepared from 200 parts of a sodium alginate solution of 2.5% strength, 1 part of acetic acid of 40% strength and 600 parts of water.

A union fabric consisting of 55% of polyethyleneterephthalate fiber and 45% of wool is padded at 40 to 50° C. with the padding solution so prepared, the impregnated goods retaining 65 to 70% of their dry weight of padding liquor. The material is subsequently subjected to a heat treatment for 1 minute at 200° C.

What is claimed is:

1. A process for dyeing and printing polyalkylene terephthalate fibers, wherein the fibrous material is heated with an aqueous dispersion of a dyestuff of the formula

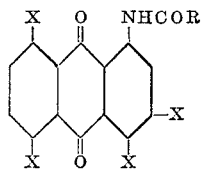

in which formula R represents a benzene radical, and at least one X represents a member selected from the group consisting of hydrogen atoms, amino groups, lower alkanoyl amino groups, a lower alkoxy group and a halogen atom, and the other symbols X represent hydrogen atoms, and Y is a member selected from the group consisting of hydrogen, halogen, lower alkyl, lower alkoxy, phenoxy, lower alkylmercapto, nitro, cyano, acetyl and lower carbalkyl groups.

2. A process as claimed in claim 1, wherein there is used the compound of the formula

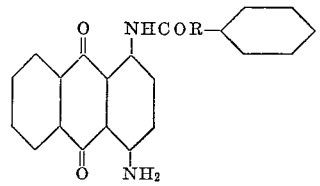

3. A process as claimed in claim 1, wherein there is used the compound of the formula

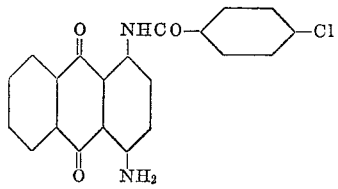

4. A process as claimed in claim 1, wherein there is used the compound of the formula

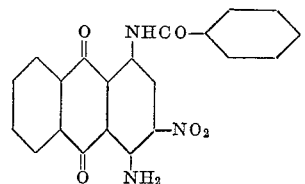

5. A process as claimed in claim 1, wherein there is used the compound of the formula

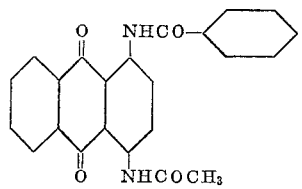

References Cited

UNITED STATES PATENTS 2,876,061   3/1959   Mautner _____ 8—i

OTHER REFERENCES

H. A. Lubs, The Chemistry of Synthetic Dyes and Pigments, 1955, pages 471 and 420.

K. Venkataraman, The Chemistry of Synthetic Dyes, vol. 2, 1952, p. 882.

GEORGE F. LESMES, Primary Examiner

T. J. HERBERT, JR., Assistant Examiner

U.S. Cl. X.R.

8—55; 260—377

CASE 4947/E/CIP  D

PO-1050
(5/69)

UNITED STATES PATENT OFFICE
CERTIFICATE OF CORRECTION

Patent No. 3,473,882          Dated October 21, 1969

Inventor(s) KURT WEBER ET AL

It is certified that error appears in the above-identified patent and that said Letters Patent are hereby corrected as shown below:

Column 7, lines 41 to 48, amend the right hand side of the formula to read:

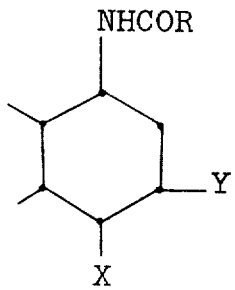

Column 8, lines 3 to 10, amend the right hand side of the formula to read:

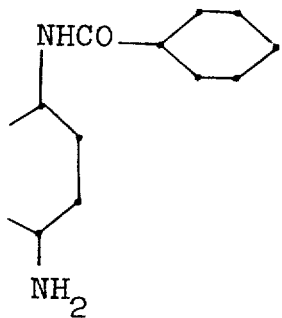

SIGNED AND
SEALED
JUN 5 1971

(SEAL)
Attest:

Edward M. Fletcher, Jr.
Attesting Officer

WILLIAM E. SCHUYLER, JR.
Commissioner of Patents